(12) United States Patent
Stroomer et al.

(10) Patent No.: US 7,086,030 B1
(45) Date of Patent: Aug. 1, 2006

(54) INCREMENTAL NETLISTING

(75) Inventors: Jeffrey D. Stroomer, Lafayette, CO (US); Roger B. Milne, Boulder, CO (US); Haibing Ma, Superior, CO (US); Jonathan B. Ballagh, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 429 days.

(21) Appl. No.: 10/633,830

(22) Filed: Aug. 4, 2003

(51) Int. Cl.
*G06F 17/50* (2006.01)

(52) U.S. Cl. .................... 716/18; 716/3; 716/4
(58) Field of Classification Search .............. 716/1, 716/3–5, 18
See application file for complete search history.

(56) References Cited

U.S. PATENT DOCUMENTS 6,425,116 B1 * 7/2002 Duboc et al. .................. 716/18
2001/0034876 A1 * 10/2001 Panchul et al. ............... 716/18

* cited by examiner

*Primary Examiner*—Paul Dinh
(74) *Attorney, Agent, or Firm*—LeRoy D. Maunu

(57) ABSTRACT

Method and apparatus for preparing a design in a high-level modeling system. Hardware description language (HDL) code is generated for one or more of a plurality of high-level subsystems in a high-level design tagged by the user for HDL code generation. Previously generated HDL code may be reused instead of generating new HDL code for each subsystem tagged by the user for HDL code reuse.

19 Claims, 5 Drawing Sheets

| | | |
|---|---|---|
| Netlist (block b) | | ⌐ 100 |
| 102 | If (b has been netlisted incrementally && previously-generated HDL code should be reused) | |
| 104 | | reuse the previously-generated HDL code |
| 106 | | return |
| 108 | else | |
| 110 | | for each sub-block b1 of b |
| 112 | | Netlist (b1) |
| 114 | | Use the HDL code for sub-blocks (if any) to generate new HDL code for b |
| 116 | | return |

FIG. 1

INCREMENTAL NETLISTING

FIELD OF THE INVENTION

The present invention generally relates to tools for generating electronic circuit designs.

BACKGROUND

A high level modeling system (HLMS) is a software tool in which electronic designs can be described, simulated, and translated by machine into equivalent low-level electronic hardware. Often, this hardware is described in a hardware description language (HDL) such as VHDL or Verilog. An HLMS provides a higher level of abstraction for describing and simulating an electronic circuit than does an HDL simulation environment such as the ModelSim environment from the Model Technology Company. In an HLMS, the focus is on convenience, and the view is high-level and abstract. For example, signals in an HLMS are often real numbers, complex numbers, or elements of finite fields. In contrast, signals in HDL are usually bit vectors. It is essential that HLMS high-level abstractions faithfully reflect results produced in hardware. The Xilinx System Generator tool for DSP and Altera's DSP Builder are example HLMS's which have such capabilities.

Ordinarily in an HLMS, the components from which designs are built are high-level blocks made available by the HLMS itself. Often, however, it is also useful to allow components to be constructed by "importing" HDL from outside the HLMS. Ideally, imported components have all the capabilities that ordinary components do, such as the ability to connect to other components, participate in simulations, and translate into HDL.

There are several reasons why a designer might want to use imported components. For example, it may be far easier to import a component than to recreate the same capabilities using blocks supplied by the HLMS because components are often complicated and expensive to develop. Imported components may take advantage of hardware resources that are not otherwise available in the HLMS. Often a design developed in an HLMS is ultimately intended to be part of a larger design. Allowing components to be imported means more of the larger design can be simulated.

The process of translating an HLMS design into HDL is usually known as "netlisting". Netlisting imported components may be simple, fast, and memory-efficient because nothing is required except to copy the HDL used to define the component. However, simulating imported components is more complicated. It is usually accomplished using a tool known as a co-simulation engine.

A variety of co-simulation engines are available. Some are implemented entirely in software, while others are implemented using a mixture of software and hardware. The particular engine selected depends on design objectives as well as the compatibility between the HLMS and the engine. For example, the ModelSim simulator and the NC-SIM simulator from Cadence can be used as software co-simulation engines in an HLMS environment. Similarly, the Wildcard development board from Annapolis Microsystems and the Benone development board from Nallatech can be used as hardware co-simulation engines. In software-based co-simulations the user may perform a behavioral simulation or perform simulation using a synthesized and mapped version of the design.

An HLMS may support netlisting and simulating a design. In netlisting, the HLMS automatically translates high-level blocks of the design into HDL code. With larger and faster devices being offered at lower prices, designs targeted to these devices are growing very large. Design activities are commonly partitioned between different work groups as designs grow ever larger. Translating and simulating a large design may take a very long time or require large amounts of computer memory. The high cost of translating a large design is often viewed as a disadvantage in using an HLMS. The present invention may address one or more of the above issues.

SUMMARY OF THE INVENTION

Disclosed are methods and apparatus for preparing a design in a high-level modeling system. Generally, hardware description language (HDL) code is generated for one or more of a plurality of high-level subsystems tagged by the user for HDL code generation in a high-level design. Previously generated HDL code may be reused instead of generating new HDL code for each subsystem tagged by the user for HDL code reuse.

It will be appreciated that various other embodiments are set forth in the Detailed Description and claims which follow.

BRIEF DESCRIPTION OF THE DRAWINGS

Various aspects and advantages of the invention will become apparent upon review of the following detailed description and upon reference to the drawings in which:

FIG. 1 illustrates an example process for netlisting a block in accordance with various embodiments of the invention;

DETAILED DESCRIPTION

FIG. 1 illustrates an example process for netlisting a block in accordance with various embodiments of the invention. A design in an HLMS generally comprises a tree or hierarchy of blocks. A block that contains one or more sub-blocks is called a subsystem, and a block that has no sub-blocks is called a leaf. The illustrated recursive process, named Netlist, generally describes the process for netlisting an input block and sub-blocks of the input block. The process supports incremental netlisting of the design by allowing the user to specify whether to reuse previously-generated HDL code or to generate new HDL code.

When HDL code is imported into an HLMS to construct a component, the origins of the HDL are immaterial. Any HDL code may suffice, provided it has a form that is acceptable to the HLMS. This means HDL constructed by hand can be imported, as can HDL produced by tools external to the HLMS. It is particularly useful to import HDL generated by the HLMS itself. This allows the HLMS to handle larger designs than might otherwise be possible, and decrease the time needed for the HLMS to simulate and to netlist. It also allows the imported portions to be simulated with a co-simulation engine. The process of generating HDL code for a portion of an HLMS design, and then importing the generated HDL back into the HLMS to build a component is referred to as "incremental netlisting."

If the input block has been previously netlisted and the user has specified that the previously-generated HDL code is to be reused (step 102), the previously-generated HDL code is used in the design (step 104) and the process returns control to a higher-level process from which the incremental netlisting process was invoked (step 106).

If the input block has not been previously netlisted or the user has specified that any previously-generated HDL code is not to be reused (step 108), then the netlist process is recursively invoked for each sub-block of the input block (steps 110, 112). Once HDL code is generated for all (if any) the sub-blocks of the input block, the HDL code (if any) of the sub-blocks is used to generate new HDL code for the input block b. The process then returns control (step 116).

In another embodiment, the process may be adapted to detect when attributes of a block have been modified, in which case any previously-generated HDL code for the block may not reflect the functionality of the changed attributes. Also, changes outside a subsystem may make the previously-generated HDL for that subsystem stale. While it may not be possible for an HLMS to detect all circumstances under which the HDL code for a block has become out of date, there are at least two checks that may be performed to test for out-of-date code. For example, timestamps may be used detect out-of-date HDL code for the associated high-level block. Also, the ports in the HDL code may be examined to determine whether they match the types of ports on the block.

Figure 4:
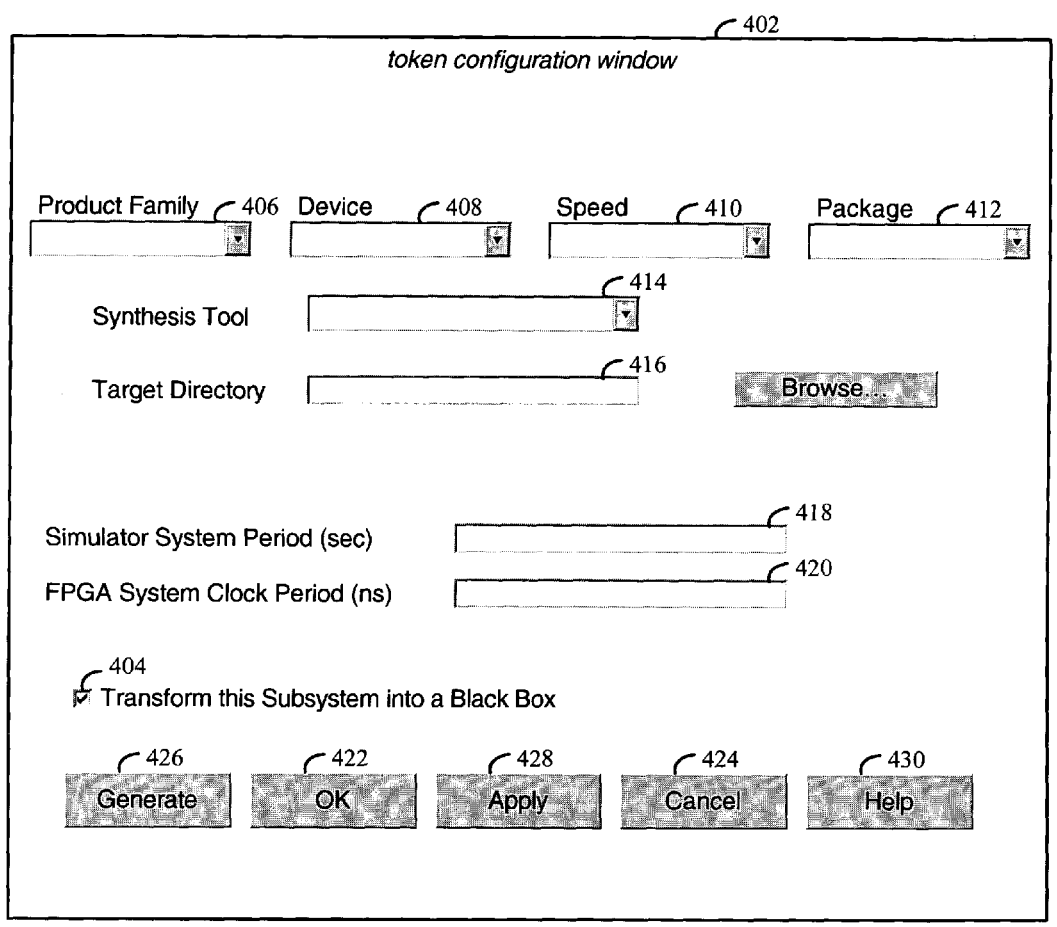
FIG. 4 illustrates an example user-interface window in a high-level modeling system in which attributes of the token may be specified.
Figure 5:
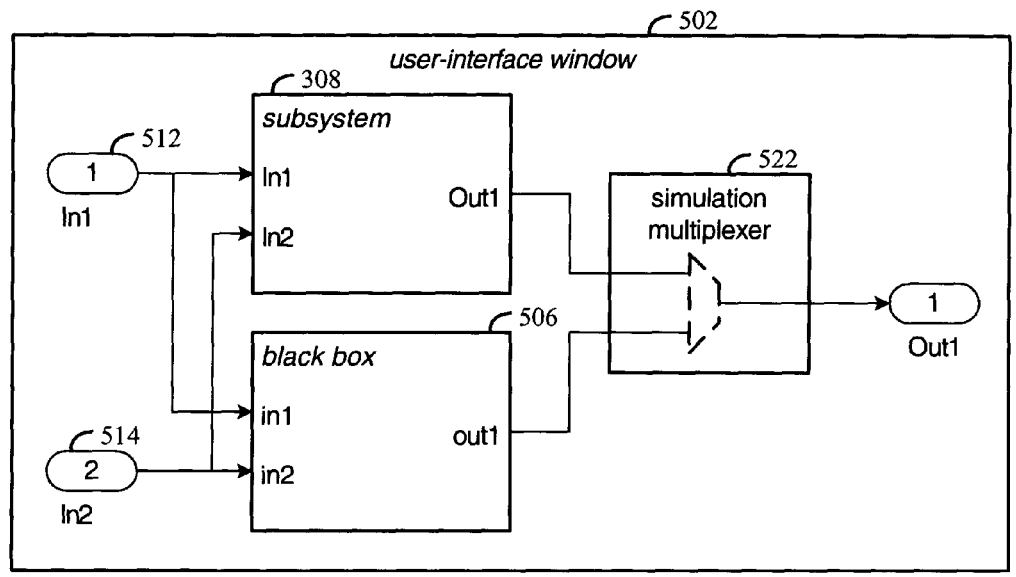
FIG. 5 illustrates an example user-interface window in an HLMS in which HDL code that implements a subsystem is represented as black box in the high-level design.

In generating the HDL code, a black box may be constructed and associated with the subsystem (FIGS. 4 and 5). The black box, which represents the HDL code, and high-level subsystem are connected in parallel to a simulation multiplexer (FIG. 5). The simulation multiplexer is used by the HLMS to selecting simulation results from either the high-level subsystem or the HDL code represented by the black box.

Figure 2:
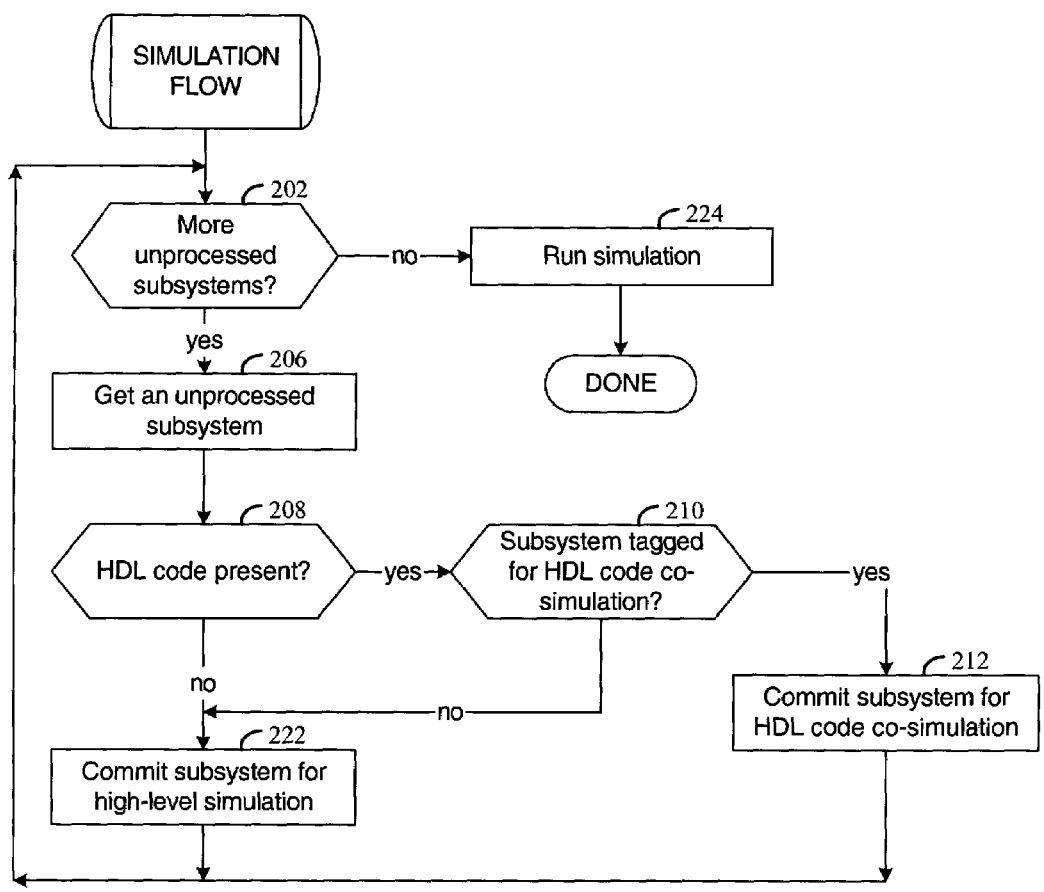
FIG. 2 is a flowchart that illustrates an example process for simulating a design in a high-level modeling system.

FIG. 2 is a flowchart that illustrates an example process for simulating a design in a high-level modeling system. The simulation process selects, according to user-specified attributes, for each subsystem whether the high-level block or HDL code that may have been generated from the block is to be used in simulating the design.

The process iterates through the subsystems that are to be part of the simulation (decision step 202). For each subsystem that has not been committed for either high-level simulation or HDL code co-simulation ("unprocessed") (step 206), the process checks whether HDL code has been generated for the subsystem (decision step 208). If HDL code is present, and the user has tagged the subsystem for HDL code co-simulation (decision step 210), the subsystem is committed for HDL code co-simulation (step 212).

The steps taken in committing a subsystem for co-simulation depend on the co-simulation engine. Typically, however, a connection is established with the co-simulation engine, and the HDL is prepared for the engine. For example, preparing a subsystem for the ModelSim engine may involve building a wrapper around the HDL and submitting the HDL to the ModelSim engine for compilation. For hardware co-simulation, preparing may involve building a wrapper around the HDL and then compiling the HDL for execution in hardware. A further description of wrapper building is found in co-pending U.S. patent application Ser. No. 10/388,728, titled "Method and Apparatus for Providing an Interface to an Electronic Design of an Integrated Circuit", by Roger B. Milne, et. al., filed Mar. 14, 2003, which is incorporated by reference herein.

If no HDL code has been generated for the subsystem (decision step 208), or if the subsystem has not been tagged for HDL code co-simulation (decision step 210), the subsystem is committed for high-level simulation (step 222). For example, for a leaf block in the Sysgen modeling system, the HLMS calls a member function that instructs the leaf to prepare for simulation. The leaf handles the preparations for high-level simulation. No preparatory operations are required for a block that is not a leaf.

Once all the subsystems have been committed for either co-simulation or high-level simulation (decision step 202), the design is simulated (step 224). The HDL co-simulation may be performed using either a software-based or a hardware-based co-simulator. The HLMS performs the high-level simulation and controls interactions between the co-simulation and the high-level simulation.

It will be appreciated that HLMSs generally support nesting of subsystems. That is, each subsystem may be a constituent of a higher-level subsystem. Nesting of subsystems provides a higher level of design abstraction. The processes for generating HDL code and simulating the design may also be applied to designs having nested subsystems. The HDL generation, code reuse, and simulation tags associated with a subsystem may be construed to apply to all nested subsystems within that subsystem. The tags of a nested subsystem would not generally be construed to apply to the subsystem that contains the nested subsystem.

Figure 3:
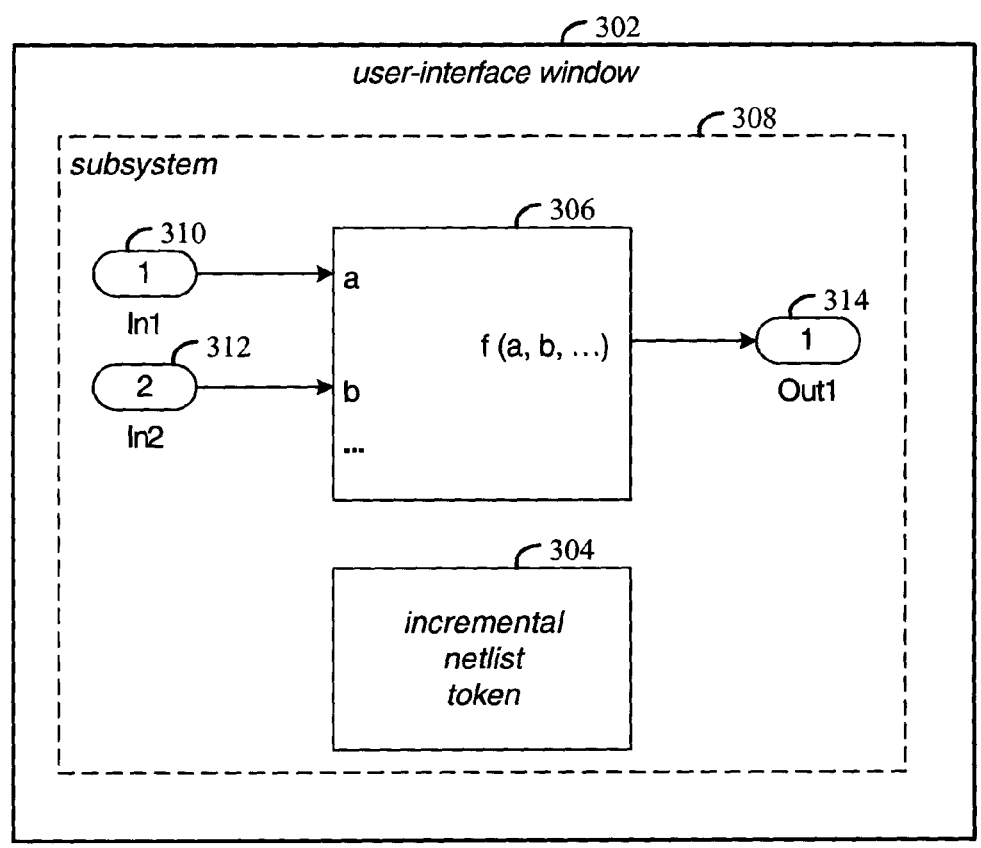
FIG. 3 illustrates an example user-interface window in a high-level modeling system in which a token is introduced for control of incremental netlisting.

FIG. 3 illustrates an example user-interface window 302 in a high-level modeling system in which a token 304 is introduced for control of incremental netlisting. A drop-and-drag interface is a common feature of an HLMS. This type of interface typically displays functional blocks, which a user may select and drag to a design window using a mouse, for example. An example block is block 306, which implements a function, f, of inputs a, b, . . . Block 306 has been instantiated as part of subsystem 308. Signals named In1 and In2, on ports 310 and 312, respectively, are connected to input ports a and b of block 306. The output from block 306 is connected to port 314, and the signal at port 314 is named Out1.

The incremental netlist token 304 is an instance of an object that may be associated with a subsystem, for example, by dragging and dropping the token in the subsystem. The user may configure attributes of the token to control whether HDL code should be generated for the subsystem and associated with a black box.

FIG. 4 illustrates an example user-interface window 402 in a high-level modeling system in which attributes of the token may be specified. Checkbox 404 may be selected by the user to control what the HLMS does with the HDL code after it has been generated. If box 404 is checked, the HLMS associates the generated HDL code with a black box and connects the black box to the design in parallel with the subsystem from which the black box was derived. The HLMS supplements the HDL code with wrapper HDL in support of connecting the black box to the design. Checkbox 404 also allows the user to either make the black box available for simulation along with other blocks in the design (by checking the box) or to leave the generated HDL code disconnected from the design (leaving the box unchecked). When the HDL code is left disconnected, the user may perform various design activities on the HDL code in isolation from the rest of the design.

Various other attributes may be specified by the user to control generation of the HDL code and co-simulation. For example, the user may specify the product family 406, device identifier 408, device speed 410, and package name 412 of the device to which the HDL code is targeted. The user may also specify the synthesis tool 414 used to generate the HDL code and the target directory 416 in which the HDL code is to be stored. Other co-simulation attributes such as the period 418 of the simulator (co-simulation engine) or the system clock period 420 of the device on which the HDL is to be co-simulated.

Selection of the OK button 422 saves the current settings in the window 402 and closes the window, and selection of the Cancel button 424 closes the window without saving the settings. Selection of the Apply button 428 saves settings but does not close the window. Selection of the Generate button 426 causes the HLMS to generate HDL code for the subsystem and create an associated black box.

Selection of the Help button 430 displays information that describes use of the fields in the token configuration window 402.

FIG. 5 illustrates an example user-interface window 502 in an HLMS in which HDL code that implements subsystem 308 is represented as black box 506 in the high-level design. The input signals In1 and In2 on input ports 512 and 514 are input to both the subsystem and to the black box.

A simulation multiplexer 522 is used to connect the black box in parallel with the subsystem from which it was generated. The simulation multiplexer allows the user to specify which of its drivers should supply results for simulation, and which should be used as the source when generating HDL. In one embodiment, the simulation multiplexer is not an actual component in the design, but is a construct through which the user may specify to the HLMS whether the high-level subsystem component 308 or the HDL code associated with the black box 506 is to be used for simulation. In addition, the simulation multiplexer allows the user to select whether HDL code is to be reused when the design is netlisted.

Figure 6:
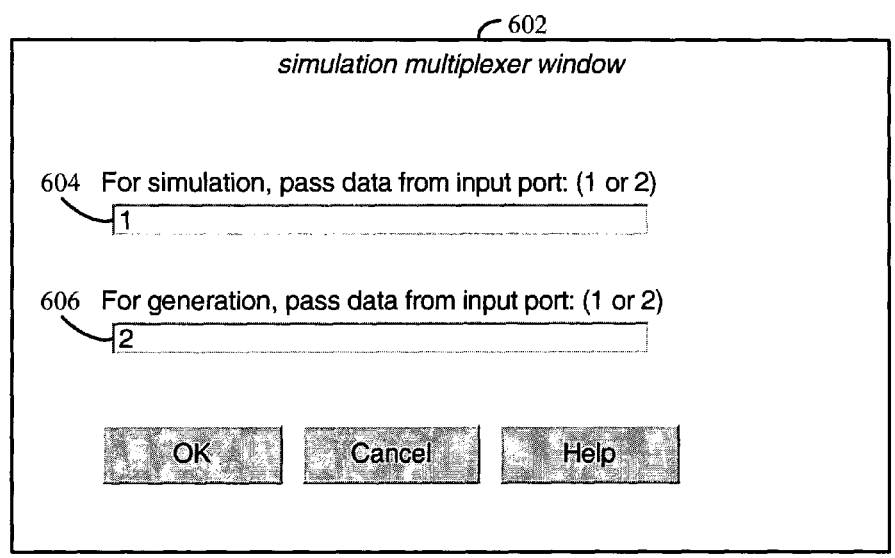
FIG. 6 illustrates an example user-interface window in an HLMS in which attributes of a simulation multiplexer may be specified.

FIG. 6 illustrates an example user-interface window 602 in an HLMS in which attributes of a simulation multiplexer may be specified. Block 604 allows the user to select whether simulation will use the high-level subsystem (e.g., 1 specified as the port of the simulation multiplexer from which input data is passed) or the HDL code associated with the black box (e.g., 2 specified as the port of the simulation multiplexer from which input data is passed).

Block 606 allows the user to specify for the subsystem whether previously generated HDL code is to be reused when the design is netlisted. For example, the value 1 specifies that data is to be passed from input port 1, with input port 1 of the simulation multiplexer being connected to the high-level subsystem. Thus, the value 1 would cause the HDL code for the subsystem to be regenerated (not reused) when the design is netlisted. The value 2, on the other hand, causes the HDL code associated with the black box to be reused when the design is netlisted.

In another embodiment, configurable subsystems may be used to specify which drivers in the subsystem are to supply results for simulation and which drivers should be used as the source when generating HDL. For example, the Simulink system supports configurable subsystems. A configurable subsystem is a special kind of subsystem that consists of a library of blocks and a parameter that specifies which of the library blocks is to be used to implement the subsystem. The ports of each block in the library match one-for-one the ports of the subsystem. One or more parameters may be used to allow use of the same or different block for HDL generation versus simulation.

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

The present invention is believed to be applicable to a variety of systems for netlisting and simulating circuit designs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for preparing a design in a high-level modeling system, comprising:
   generating hardware description language (HDL) code for one or more of a plurality of high-level subsystems in a high-level design tagged by a user for HDL code generation;
   reusing previously generated HDL code instead of generating new HDL code for each high-level subsystem tagged by the user for HDL code reuse; and
   for each high-level subsystem for which HDL code is generated, displaying for the user a first block, a second block, and a simulation-multiplexer block having input ports coupled to output ports of the first and second blocks, wherein the first block represents a high-level subsystem, the second block represents HDL code generated from the high-level subsystem, and the simulation multiplexer block has a user-configurable attribute that specifies whether the previously generated HDL code is to be reused.

2. The method of claim 1, further comprising:
   detecting whether one or more attributes of a high-level subsystem have changed since HDL code for the high-level subsystem was previously generated; and
   if one or more attributes of the high-level subsystem have changed, then generating new HDL code for the high-level subsystem in place of the previously generated HDL code.

3. The method of claim 1, further comprising, for each high-level subsystem for which HDL code has been generated, simulating a selected one of the high-level subsystem and the HDL code in response to a user-specified selection.

4. The method of claim 3, wherein the simulation multiplexer block has a user-configurable attribute that selects either the high-level subsystem or the associated HDL code for simulation.

5. The method of claim of claim 1, further comprising:
   providing a user-selectable token object for placement in association with a high-level subsystem, wherein the token object has a user-configurable attribute that controls whether HDL code generated from the high-level subsystem is connected to the design and represented as a black box in association with the high-level subsystem; and
   for each high-level subsystem having an associated black box, displaying for the user the first block, the second block, and the simulation-multiplexer block.

6. The method of claim 5, wherein the token object further comprises attributes that specify characteristics of a device to which the HDL code is targeted.

7. The method of claim 6, wherein the token object further comprises attributes that specify a tool to be used for synthesis.

8. The method of claim 7, wherein the token object further comprises attributes that specify a target location for storing the HDL code.

9. A computer-implemented method for preparing a design in a high-level modeling system, comprising:
providing a user-selectable token object for placement in association with a high-level subsystem, wherein the token object has a user-configurable attribute that controls whether HDL code generated from the high-level subsystem is connected to the design and represented as a black box in association with the high-level subsystem;
for each high-level subsystem having an associated black box, displaying for the user a first block, a second block, and a simulation-multiplexer block having input ports coupled to output ports of the first and second blocks, wherein the first block represents the high-level subsystem, the second block represents the black box, and the simulation multiplexer block has user-configurable attributes that control whether the previously generated HDL code is to be reused and that select one of the high-level subsystem and the associated HDL code for simulation;
detecting whether one or more attributes of a high-level subsystem have changed since HDL code for the subsystem was previously generated;
reusing previously generated HDL code instead of generating new HDL code for each high-level subsystem tagged by the user for HDL code reuse if no attributes of a high-level subsystem have changed; and
if one or more attributes of the high-level subsystem have changed, then generating new HDL code for the high-level subsystem in place of the previously generated HDL code.

10. The method of claim 9, wherein the token object further comprises attributes that specify characteristics of a device to which the HDL code is targeted.

11. The method of claim 10, wherein the token object further comprises attributes that specify a tool to be used for synthesis.

12. The method of claim 11, wherein the token object further comprises attributes that specify a target location for storing the HDL code.

13. An apparatus for preparing a design in a high-level modeling system, comprising:
means for generating hardware description language (HDL) code for one or more of a plurality of high-level subsystems in a high-level design tagged by the user for HDL code generation;
means for reusing previously generated HDL code instead of generating new HDL code for each high-level subsystem tagged by the user for HDL code reuse; and
means for displaying to a user for each high-level subsystem for which HDL code is generated, a first block, a second block, and a simulation-multiplexer block having input ports coupled to output ports of the first and second blocks, wherein the first block represents a high-level subsystem, the second block represents HDL code generated from the high-level subsystem, and the simulation multiplexer block has a user-configurable attribute that specifies whether the previously generated HDL code is to be reused.

14. The apparatus of claim 13, further comprising:
means for detecting whether one or more attributes of a high-level subsystem have changed since HDL code for the high-level subsystem was previously generated; and
means for controlling whether new HDL code is generated for the high-level subsystem in place of the previously generated HDL code in response to a changed one or more of the attributes of the high-level subsystem.

15. An article of manufacture for preparing a design in a high-level modeling system, comprising:
a computer-readable medium configured with instructions for causing a processor arrangement to perform the steps of,
generating hardware description language (HDL) code for one or more of a plurality of high-level subsystems in a high-level design tagged by the user for HDL code generation;
reusing previously generated HDL code instead of generating new HDL code for each subsystem tagged by the user for HDL code reuse; and
for each high-level subsystem for which HDL code is generated, displaying for the user a first block, a second block, and a simulation-multiplexer block having input ports coupled to output ports of the first and second blocks, wherein the first block represents a high-level subsystem, the second block represents HDL code Generated from the high-level subsystem, and the simulation multiplexer block has a user-configurable attribute that specifies whether the previously generated HDL code is to be reused.

16. The article of manufacture of claim 15, wherein the computer-readable medium is further configured with instructions for causing the processor arrangement to perform the steps of,
detecting whether one or more attributes of a high-level subsystem have changed since HDL code for the subsystem was previously generated; and
if one or more attributes of the subsystem have changed, then generating new HDL code for the subsystem in place of the previously generated HDL code.

17. The article of manufacture of claim 15, wherein the computer-readable medium is further configured with instructions for causing the processor arrangement to perform the step of, for each high-level subsystem for which HDL code has been generated, simulating a user-selected one of the high-level subsystem and the HDL code in response to a user-specified selection.

18. The article of manufacture of claim 17, wherein the simulation multiplexer block has a user-configurable attribute that selects one of the high-level subsystem and the associated HDL code for simulation.

19. The article of manufacture of claim of claim 15, wherein the computer-readable medium is further configured with instructions for causing the processor arrangement to perform the steps comprising:
providing a user-selectable token object for placement in association with a high-level subsystem, wherein the token object has a user-configurable attribute that controls whether HDL code generated from the high-level subsystem is connected to the design and represented as a black box in association with the high-level subsystem; and
for each high-level subsystem having an associated black box, displaying for the user the first block, the second block, and the simulation-multiplexer block.

* * * * *